US007113925B2

(12) United States Patent
Waserstein et al.

(10) Patent No.: US 7,113,925 B2
(45) Date of Patent: Sep. 26, 2006

(54) ELECTRONIC CHECK

(75) Inventors: Alan I. Waserstein, Miami Beach, FL (US); Atal Bansal, Miami Lakes, FL (US)

(73) Assignee: Echeck21, L.L.C., Miami Lakes, FL (US)

( * ) Notice: Subject to any disclaimer, the term of this patent is extended or adjusted under 35 U.S.C. 154(b) by 0 days.

(21) Appl. No.: 11/039,322

(22) Filed: Jan. 19, 2005

(65) Prior Publication Data

US 2006/0161501 A1 Jul. 20, 2006

(51) Int. Cl.
*G06Q 99/00* (2006.01)
*H04K 1/00* (2006.01)

(52) U.S. Cl. .............................. 705/50; 705/1; 705/33; 705/64; 705/67; 705/75; 713/165; 713/175; 713/176

(58) Field of Classification Search .............. 705/1, 705/33, 64, 67, 75, 50; 713/165, 175–176
See application file for complete search history.

(56) References Cited

U.S. PATENT DOCUMENTS

| | | | |
|---|---|---|---|
| 4,623,965 A | 11/1986 | Wing | |
| 5,237,158 A | 8/1993 | Kern et al. | |
| 5,305,196 A | 4/1994 | Deaton et al. | |
| 5,504,677 A | 4/1996 | Pollin | |
| 5,677,955 A | 10/1997 | Doggett et al. | |
| 5,768,385 A | 6/1998 | Simon et al. | |
| 5,903,881 A | 5/1999 | Schrader et al. | |
| 6,073,121 A | 6/2000 | Ramzy | |
| 6,138,107 A | 10/2000 | Elgamal | |
| 6,185,542 B1 | 2/2001 | Moran et al. | |
| 6,611,598 B1* | 8/2003 | Hayosh | 380/54 |
| 6,789,068 B1 | 9/2004 | Blaze et al. | |
| 2002/0002675 A1* | 1/2002 | Bush | 713/160 |
| 2002/0065786 A1 | 5/2002 | Martens et al. | |
| 2002/0103730 A1* | 8/2002 | Perley et al. | 705/30 |
| 2003/0093368 A1 | 5/2003 | Manfre et al. | |
| 2003/0172037 A1* | 9/2003 | Jung et al. | 705/64 |
| 2004/0143553 A1* | 7/2004 | Torget et al. | 705/66 |

FOREIGN PATENT DOCUMENTS

| | | | |
|---|---|---|---|
| EP | 99125264.4 | * | 6/2000 |
| EP | 1 164 554 | | 12/2001 |
| WO | WO/ 01 84453 | | 11/2001 |

OTHER PUBLICATIONS

"NetCheque," www.netchequ.org, printed Nov. 11, 2004.
Gennady Medvinshky and B. Clifford Neuman. "Requirements for Network Payment: The NetCheque Perpective," Mar. 1995.
Gennady Medvinshky and B. Clifford Neuman. "NetCash: A design for practical electronic currency on the Internet," Nov. 1993.
B. Clifford Neuman. "Proxy-based authorization and accounting for Distributing Systems," May 1993.

* cited by examiner

*Primary Examiner*—Kambiz Abdi
(74) *Attorney, Agent, or Firm*—Barnes & Thornburg LLP

(57) ABSTRACT

An electronic check that is created by a secure electronic transmission which can be printed as a paper check by the payee. The electronic check is created by a software program that makes a digital image of the check, securely encrypts the digital image and transmits the digital image to the payee. The payee then uses special software to decrypt the transmitted check image, which is then capable of being printed as a paper check by the payee. The payee can deposit the paper check to the bank. Optionally, the payee can electronically transmit the check image to the payee's bank.

26 Claims, 15 Drawing Sheets

Proposed Lifecycle of electronic check (Payor-Payee-Bank)

Current Lifecycle of a check (Payor-Payee-Bank) – Prior Art

Proposed Lifecycle of electronic check (Payor-Payee-Bank)

ELECTRONIC CHECK

FIELD OF INVENTION

The invention relates generally to an electronic check and more particularly to a method and system for the creation of an electronic check image by a payor through use of software, the encryption and secure transmission of the electronic check image and the receipt, decryption and printing by the payee of the electronic check.

BACKGROUND OF THE INVENTION

With the digital revolution and subsequent advent of the world wide web, digitized information can now almost instantaneously be transmitted from one party to another. Consequently, several payment and money transfer mechanisms have evolved around the internet.

Typical payment methods require the payor or payee to exchange sensitive information. For example, some payment methods require the payor to give the payee sensitive information in order to complete the payment. Such methods include credit card transactions, debit card transactions, electronic check acceptance, and automatic bill payment. The sensitive information requested may include credit card number, debit card number, or bank account number. These transactions have many disadvantages. One such disadvantage is that the sensitive information disclosed by the payee could be used fraudulently by an unauthorized party. Another disadvantage requires the involvement of third-party entities that not only route electronic transaction data (for example using payment gateways) but also charge additional fees for their involvement. Additionally, in some cases, special equipment is required to receive payments by the payee. This includes credit card readers, debit card readers with specialized PIN-pads, check readers that can read MICR data, and the like. Additional special equipment and handling adds further to the total expense.

Electronic payment alternatives, such as wire transfer payments, require payors to obtain special information from the payees, including personal account numbers and routing numbers. Providing such information raises privacy concerns. Wire transfers and the exchange of sensitive information over the internet are prone to digital fraud wherein data is hijacked during transmission by a third-party. Many large companies do not permit wire transfers for security reasons.

Other methods of payment, such as automatic bill payment authorizations, require the payee to provide sensitive information to the payor. Though not very prevalent, this mechanism does not usually have any protection against fraud. The payees rely upon the payors to correctly make direct electronic deposits into their accounts.

Of special consideration is the payment mechanism evolved by internet transactions wherein a third party acts as a middleman in receiving sensitive information. An example of this payment method is PAYPAL. In this method, PAYPAL acts as an intermediary and accepts the payment from payor by requesting sensitive information from payor. PAYPAL then transfers monies to the payee by wire transfer or sending a check. PAYPAL also acts as an intermediary financial institution by accepting the payor funds and then transferring them to the payee. For its services, PAYPAL charges a fee.

The biggest disadvantage in the existing electronic methods in comparison to traditional paper checks is that the payor and payee need to be able to contact each other prior to making the transaction. A check, in sharp contrast, does not need an exchange of "sensitive" information between the parties except for the payee's name and address. Accordingly, checks are deemed more safe and hence, more frequently used, as compared to existing electronic mechanisms. Additionally, checks do not need special equipment or accreditations.

In addition to the differences mentioned above, different laws govern checks as compared to electronic payment mechanisms. Regular paper checks are governed by check laws, such as Regulation CC and Check21, while rules of the National Automated Clearing House Association (NACHA) govern electronic payment mechanisms.

The popularity of checks, even though decreasing, is illustrated by the fact that an estimated 42.5 billion checks were paid in the United States in 2000. This amounts to 59.5% of the total retail non-cash payments made in the United States. In terms of value, checks were equivalent to 39.3 trillion dollars, i.e. 84.4% of the total value of retail non-cash payments. It is estimated that a check is typically handled on average 19 times, increasing the opportunity for errors. Financial institutions spend $6 billion to $8 billion per year on check processing. Estimates of the cost savings attributed to check imaging and image exchange range from $1 billion to $2.1 billion.

The Check Clearing for the 21st Century Act ("Check 21 Act"), 12 U.S.C. §5001, was enacted on Oct. 28, 2003 and became law in the United States on Oct. 28, 2004. To facilitate check truncation and electronic check exchange, the Check 21 Act authorizes a new negotiable instrument called a "substitute check." A substitute check is a paper reproduction of the original check that contains an image of the front and back of the original check and can be processed in the same manner as the original check. The Check 21 Act provides that a properly prepared substitute check is the legal equivalent of the original check for all purposes. The Check 21 Act does not require any bank to create substitute checks or to accept checks electronically. The Check 21 Act includes new warranties, an indemnity, and expedited recredit procedures that protect substitute check recipients.

The Check21 law created a new token called the substitute check. In its existing form, the substitute check is a digital image of the original check and is governed by the ANSI X.9100-140 standards. There are certain differences between the electronic check of this invention and a substitute check. These differences are the digital patterns and images and the fact that the entity receiving the check need not be a bank.

Previous attempts have been made to provide electronic payments or checks. U.S. Pat. No. 6,138,107 to Elgamal discloses a method and apparatus for providing electronic accounts over a public network. The patent provides the internet commerce community with an electronic money account, where a buyer connected to the internet can purchase electronic money from a payment gateway, deposit the electronic money in an electronic money account in the payment gateway, and use the electronic money account to purchase goods on the internet, based on an underlying secure courier system.

U.S. Publication No. US20020065786 to Martens et al. describes a method for depositing a check from home or office directly into a bank account by running it through a special scanner that generates an image of the check and digitally signs it. The systems uses encryptions imprinted on the check, a secret key, and a plurality of digital signatures based upon the concatenated branch number, account number and check number.

For a general reference on electronic payments, see for instance, Requirements for Network Payment: The NetCheque Perspective, University of Southern California, MacWorld, pp. 114 (November 1995) (an on-line checking system in which an account holder can send an electronic document that a recipient can deposit electronically into a bank account as a check, where the document contains the name of the payer, financial institution, payer's account number, payee's name, and amount of check, and which includes a digital signature of the payer and which may include a digital signature of a payee); see also NetCash: A Design for Practical Electronic Currency on the Internet, University of Southern California, Computing Machinery (1993) (a framework that supports realtime electronic payments with provision of anonymity over an unsecure network. The infrastructure is based on independently managed, distributed currency servers that provide a point of exchange between anonymous electronic currency and non-anonymous instruments such as electronic checks.)

U.S. Pat. No. 6,676,310 to Simpson et al. discloses a check writing system and method for facilitating the writing of checks. The system and method pertain to receiving data to be included in a check to be printed via a network, configuring the received data for printing on a check and facilitating printing of the check. U.S. Pat. No. 5,504,677 to Pollin discloses an automated payment system. The system generates a draft, payable to the creditor and drawn on the payor's checking account, pursuant to the payor's authorization. The draft is executed by the debt collector as authorized signatory for the payor and deposited into the payee's account to complete payment.

None of the methods and systems mentioned above describe an electronic check that is created and sent by a secure electronic transmission which can be printed as a paper check by the payee. Nor do the methods or systems teach of an electronic check that is created by a software program that makes a digital image of the check, securely encrypts the digital image and transmits the digital image to a payee.

Therefore, there is a need in the art for an electronic check that eliminates the uncertainties, delays and costs associated with the physical paper check transmission. There is a need to expedite the transmission of a physical paper check. There is also a need to reduce the costs involved in the transmission of physical paper checks. Traditional paper checks require the payor to print the check, seal the check in an envelope and mail it to the payee. There is also a need to limit the environmental impact of paper use by reducing the necessity of using envelopes.

There is a further need to reduce the risk that a paper check will be soiled, physically damaged, lost or intercepted, during transit and before being deposited with the bank. Additionally, physical paper transmissions sent through public delivery mechanisms are prone to delays and uncertainties arising due to carrier delays or errors. There is also a need for the ability to transmit a check to a payee to a remote location where it may be impossible to receive a paper check.

There is a further need in the art for an electronic check that is the functional equivalent of a paper check except that it includes the Payee's email address to the list of required information. An electronic mail address is not considered financially "sensitive" and a payee would be more likely to provide this information in comparison to other information such as credit card number, debit card number, bank account number, or check number.

SUMMARY OF THE INVENTION

The current invention satisfies the above needs by providing an electronic check that is created electronically, transmitted securely by electronic means, and can be printed as a paper check by the payee. The electronic check is created by a software program that makes a digital image of the check, securely encrypts the digital image and transmits the digital image to the payee. The payee then uses special software to decrypt the transmitted check image, which is then capable of being printed as a paper check by the payee. The payee can deposit the paper check with the bank. Optionally, the payee can electronically transmit the check image to the payee's bank.

In a preferred embodiment of the invention a method for securely transmitting an electronic check comprises preparation of an electronic check by a payor, transmission of the electronic check image to a payee, receipt of the electronic check image by the payee, and conversion of the electronic check to a paper check by payee.

The invention provided is an electronic check created by the steps comprising: preparation of the electronic check using a software program that makes a digital image of the check, encryption of the digital image, transmission of the digital image to a payee, and decryption of the digital image.

Therefore, it is an object of the present invention to provide an electronic check capable of being processed by existing electronic payment processing mechanisms. The invention is capable of producing a traditional paper check. The improvement is in the reproduction and transmission of the check from the payor to the payee. The final paper check reproduced from the electronic check or digital image will be subject to check laws and will continue to be as useful and prevalent as the traditional paper check.

It is further object of the present invention to provide a system for transmitting an electronic check comprising: means for a payor to prepare the electronic check by inputting a payee name and address and the electronic check amount into a payor software program wherein the software program generates an electronic check image; encryption of the electronic check image utilizing a payee public key; transmission of the electronic check image by email from the payor to the payee; receipt of the electronic check image by the payee; decryption of the electronic check image using a payee key by the payee; and printing of a paper check from the electronic check image.

It is an additional object of the present invention to provide a system for transmitting an electronic check comprising: means for a payor to prepare an electronic check by inputting a payee name and address and the electronic check amount into a payor software program wherein the software program generates an electronic check image; encryption of the electronic check image utilizing the payment gateway public key; transmission of the electronic check image by electronic mail from the payor to a payment gateway; notification of receipt of the electronic check sent to the payee from the payment gateway; and receipt of the electronic check image by the payee through the internet These and other objects, features, and advantages of the present invention may be better understood and appreciated from the following detailed description of the embodiments thereof, selected for purposes of illustration and shown in the accompanying drawings.

DETAILED DESCRIPTION

Figure 1:
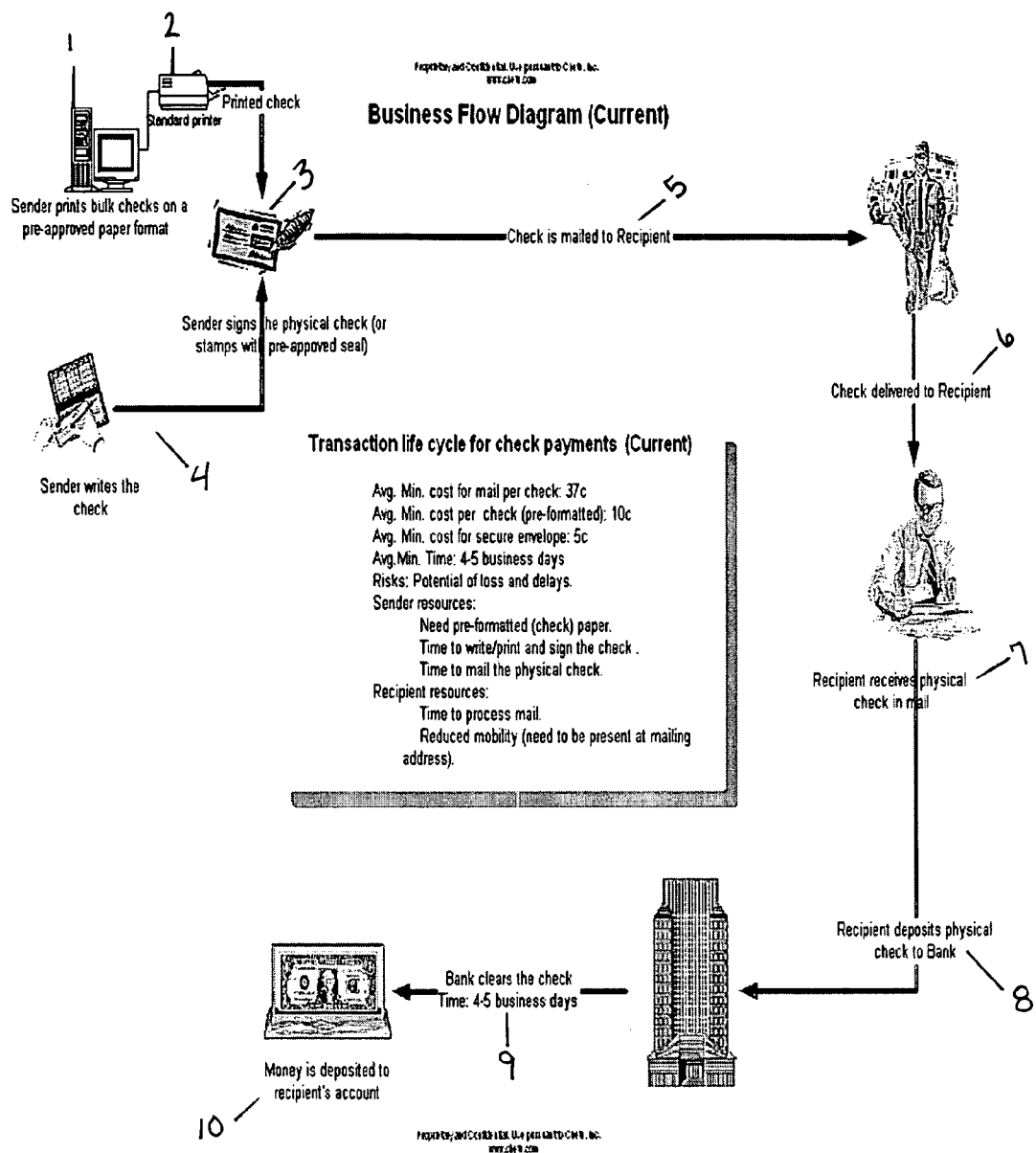
FIG. 1 is a flow diagram of the current lifecycle of a paper check (Prior art).

FIG. 1 is a flow diagram of the current lifecycle of a paper check as known in the prior art. If the checks are being generated in bulk quantities, such as for a company, the sender prints the bulk checks on a pre-approved paper format from a computer in step 1. The printer 2 can be a standard printer. If the checks are being written by an individual, the sender writes the check with a pen on a pre-approved check 4. The check is then mailed to the recipient in step 5. The check is delivered to the recipient 6. In step 7, the recipient receives the physical check in the mail. Step 8 involves the recipient depositing the physical check in the bank. In step 9, the bank processes and clears the check, which can take an average of four to five business days. The money is then deposited into the recipient's bank account in step 10.

There are many disadvantages to this system. First, there is a cost related to sending checks by mail, which include the cost of stamps and the cost of checks and envelopes. There is also a significant time delay in mailing payment, as a payment takes five to seven businesses days to reach the recipient and another four to five days for the bank to process. Additionally, the sender cannot receive payment unless he/she is at the physical address where the check has been sent. There is also a security risk in that a mailed check can easily be intercepted and there is no way for the payor to verify that the check has been delivered to the payee.

Figure 2:
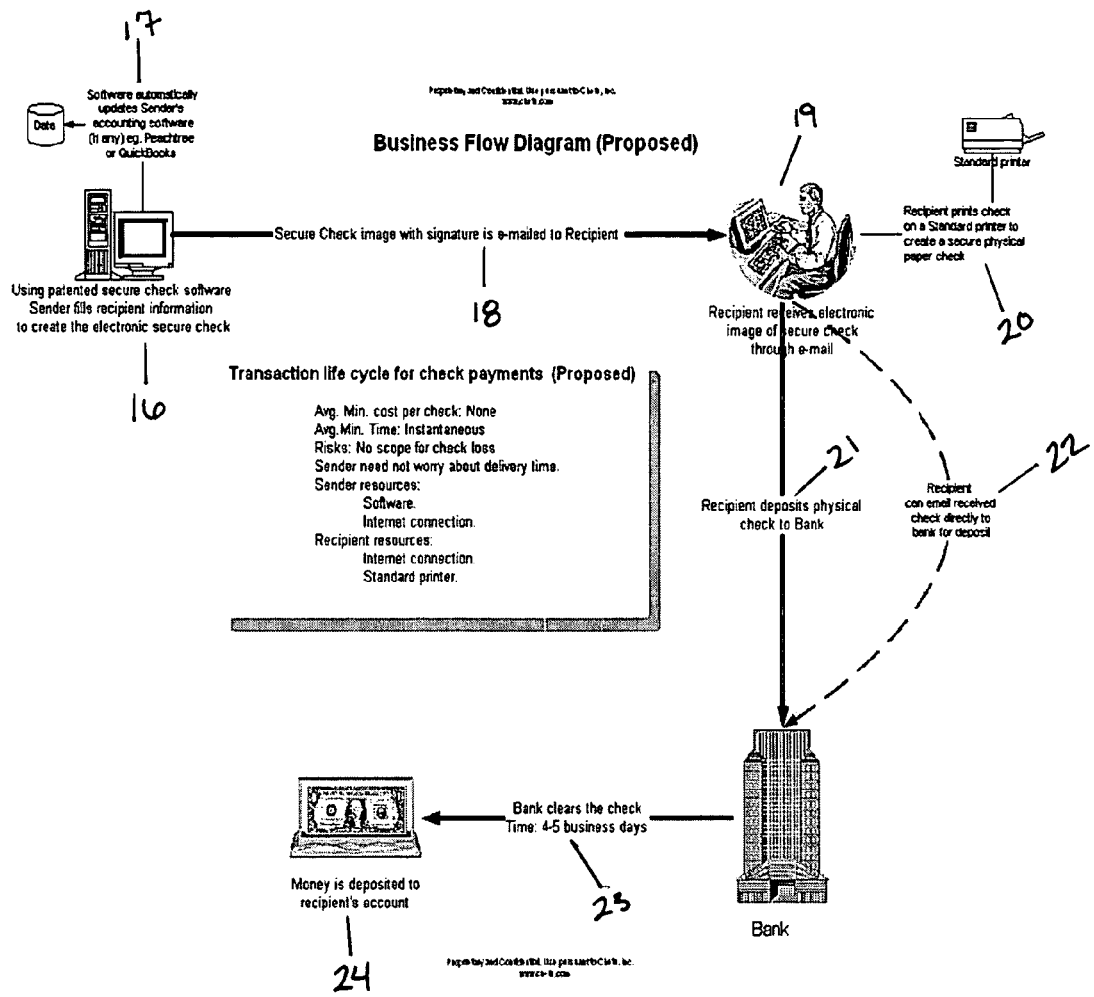
FIG. 2 is a flow diagram of the lifecycle of an electronic check of the invention.

In a preferred embodiment of the invention, a payor sends an electronic check to a payee by email and the payee prints the check and deposits it at the bank or the payee forwards the check electronically to the payee's bank account for deposit. As shown in the flow diagram of FIG. 2, the payor uses secure check software in step 16 to fill in recipient information and create an electronic check. During the creation of the digital image, the software encrypts the digital image. In step 17 the software automatically updates payor's accounting software. This software can include commercially available accounting software such as QUICKBOOKS or PEACHTREE or any other available accounting software. In step 18, the secure check image with a signature is emailed to the payee. In step 19, the payee receives the electronic image of the secure check though email. By using electronic check payee software, the payee decrypts the digital image. The payee then prints the check on a standard printer to create a secure physical paper check, in step 20. In step 21, the payee deposits the physical check to the bank. Optionally, as shown in step 22, the payee can email the electronic check directly to the bank for deposit. In step 23, the bank clears the check within four to five days. Step 24 shows the money deposited to the payee's account.

Figure 3:
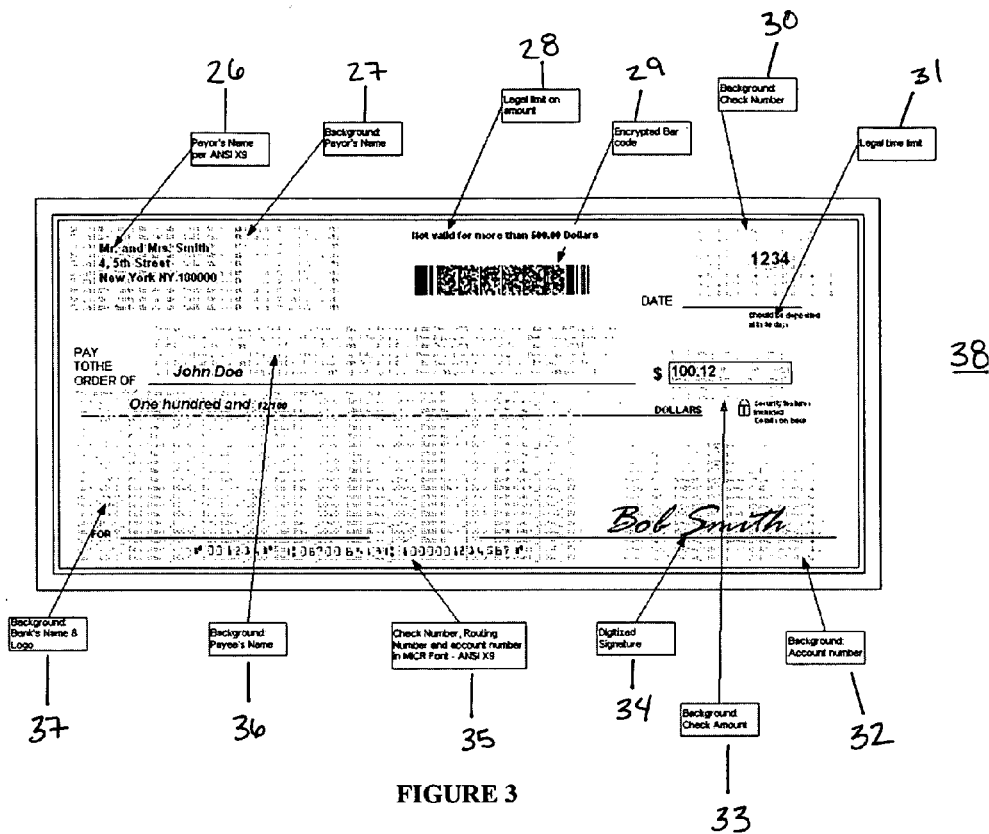
FIG. 3 shows a front view of a check image from the electronic check.

FIG. 3 is a sample electronic check image 38. Included in the electronic check image 38 are the payor's name 26, the background in the payor's name 27, a legal limit on the amount for which the check can be written 28, an encrypted bar code 29, a check number and the background surrounding the check number which repeats the check number 30, legal time limit within which the check must be cashed 31, the digitized signature 34 and a background surrounding the signature which repeats the account number 32, a background surrounding the check dollar amount which repeats the check dollar amount 33, a check number, routing number and account number in MICR font 35 according to ANSI X9 standards, a background surrounding the "pay to the order of" line which repeats the payee's name 36, and a background on the body of the check image which is the bank's name and logo 37.

The electronic check is implemented as the digital image of a physical paper check. The digital image will, as closely as possible, meet the ANSI X9 standards for physical paper checks. The final paper check may or may not meet the paper stock specifications in regulation X9.18. This would depend upon the type of paper and printer used by the payee when printing the check. This also allows for the payee to be able to use standard equipment to print the paper check. A standard computer printer should be sufficient to create the paper check from the electronic check image. The electronic check emulates substitute check standards as specified in X9.100-140.

Figure 4:
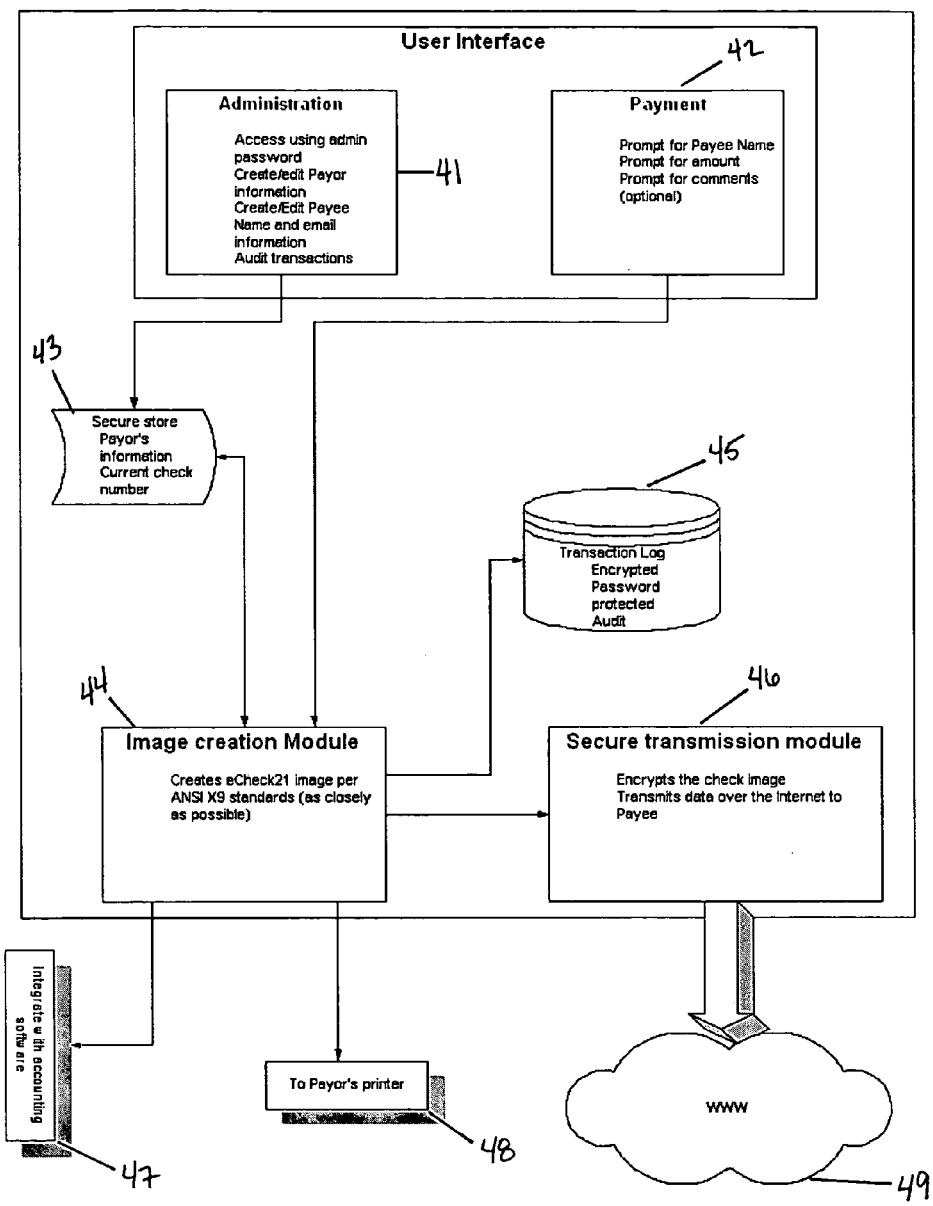
FIG. 4 is a flow diagram of electronic check payor software.

As shown in FIG. 4, the creation of the electronic check digital image is implemented using proprietary software that runs on the payor's computer as an electronic check payor module. The proprietary software can be developed using computer programming languages like Visual Basic, Visual C++, C#, .NET Framework or others and the program creates the digital image in a popular format (e.g. pdf, tiff, gif or jpg). The software is designed and developed for operation on most operating systems used in the industry today.

The software creates the electronic check digital image with a variety of security features. For instance, the ANSI X9 check specifications are used to devise the final image 44. Additionally, a bar-code is on the check image for fraud protection. The final check image has bar-code along with the check number. The bar-code information can include a combination of sender's account number, bank information, check number, amount amongst other things and a digital signature, wherein the digital signature is created using a private key known only to payor and at least a portion of the check information, such as check details, bank details, payor and payee details. A bar-code consisting of unencrypted check information and a digital signature shall be referred to herein as an encrypted bar-code. The payor information is administered by payor 41 through the user interface. Administration may involve accessing the system with a password, creating or editing payor information, creating or editing payee name and email information, and auditing transactions. Payor information, including the current check number, entered into the system or generated by the system is securely stored 43. Payment information 42 is also input into the user interface where the system will prompt the payor for the payee name, amount and any comments. For bank clearing houses that will accept bar-coded checks, this is an added fraud-protection feature. Banks have recently started use of barcode technology on checks. For example, the North Dallas Bank is already planning to implement barcode based checks in December of 2004. A bank clearing house that properly implements and accepts the bar coded checks of the invention can stop check fraud by, for example, ensuring that a particular check is processed only once thus eliminating duplicate check fraud and/or the alteration of the information on the checks.

The electronic check can also contain other security features. The check background contains the payor's name, payee's name, check number, check amount, sender name amongst other things repeated multiple times. Such an implementation is not possible with current paper checks, because the recipient, amount, check number etc. are not known at the time the check is printed. The addition of the background details will make it difficult to tamper with the check in any way that is difficult to detect. The electronic check can also incorporate microtype to prevent easy photocopying, and the barcode can encompass all of this information in encrypted form Further security measures include a licensing mechanism, transaction log, copies of the final check and integration of the electronic check software with accounting software. A licensing mechanism for the payor can be accomplished through a one-time setup license key. The image creation module 44 sends data to a transaction log 45, which provides an encrypted, password protected audit feature. Another security feature is that the payor can print 48 and keep a physical or digital copy of the check. This could be used by the payor for dispute resolution and/or accounting or audit purposes. The electronic check software can also be integrated with the payor's accounting software 47. The software implemented provides an API which allows for integration with accounting applications. By integrating the electronic check payor module with the accounting software, the payor will not have to post the check related information into the accounting software. The posting is done automatically. Additionally, through integration the payor has the option of choosing the payee's name from a drop down menu when creating an electronic check.

The electronic check payor software is installed on the payor's computer and configured with the payor's settings. Such configurations include storing the payor's name, address, bank name, logo, address, branch, bank account number, bank routing number, check number 43 amongst other things that might be needed to create the electronic check image.

The electronic check image is encrypted 46 prior to transmission over the internet 49. Encryption can be accomplished by symmetric key or public key infrastructure ("PKI") technologies. These encryption mechanisms are known in the industry. The symmetric key cryptographic system uses the same key to encode the message as to decode it. Examples of such system run from simple substitution ciphers that have been known for many years and the recently adopted Data Encryption Standard (DES). The advantage of such systems is that they are generally fast given modem day computers and they are reasonably secure. A disadvantage of such systems is that the two communicating parties must have arranged to share the key in advance. However, one cannot always know in advance with whom one might want to communicate in a secure fashion. Thus, such a system can fall short for mechanisms where two entities want to communicate securely with each other on very short notice, but have not arranged ahead of time to share a key. Also, the cost of sharing a key would not necessarily be inexpensive because the system would still require a secure form of mail to transmit the key ahead of time.

The PKI system provides two keys for a message, a public key and a private key. The public key is known to all who want to know it, while the private key is only known to the person whose security is at stake. The public key is used to encode the message and the private key is used to decode the message. Thus, if A wants to send a message to B, A first encodes the message using B's public key and then sends the message to B. B decodes the message using his private key.

The digitized check image data can be transmitted over the internet in multiple ways. For example, the image can be sent over the internet indirectly by a payment gateway, by real-time, or by a message based email or website. The image can also be sent over the internet directly by real-time or by a message based email.

The indirect transmission involves the image being sent through a payment gateway. This transmission can be in real-time which would involve a financial payment gateway. In a financial payment gateway, data is processed by the payment gateway. Not only does the gateway serve as the end-point for the payor data transmission, but it also acquires funds from the payor. The payment gateway then transfers funds to the payee. This may or may not involve a service fee for the processing gateway. The transmission can be in real-time through a non-financial payment gateway. In a non-financial payment gateway, an external payment gateway facilitates data transfer from the payor to the payee. The payment gateway does not receive or send funds to either party. The non-financial payment gateway simply acts as a channel through which data is transferred. Another method of direct transmission is through use of a message. The message can be web-based, wherein data is sent in an email message from payor to the payment gateway. The payment gateway then requests the payee to retrieve data over the web ( e.g. from its web page). Alternatively, the message can be sent via email, wherein data is sent in an email message from payor to the payment gateway. The payment gateway then routes the message to the payee.

The direct transmission involves the electronic check image being sent by real time or by message. In a real time transmission, the data is transferred directly from the payor to the payee in real-time. There is no third party payment gateway involved. When the direct transmission is message based, the data is transferred directly from the payor to the payee using messages over the internet (e.g. email).

Accordingly, the electronic check may be encrypted and the data transmitted using a combination of the above mentioned encryption technology and the data transmission mechanisms. Various embodiments of the invention are discussed below by way of example.

Figure 5:
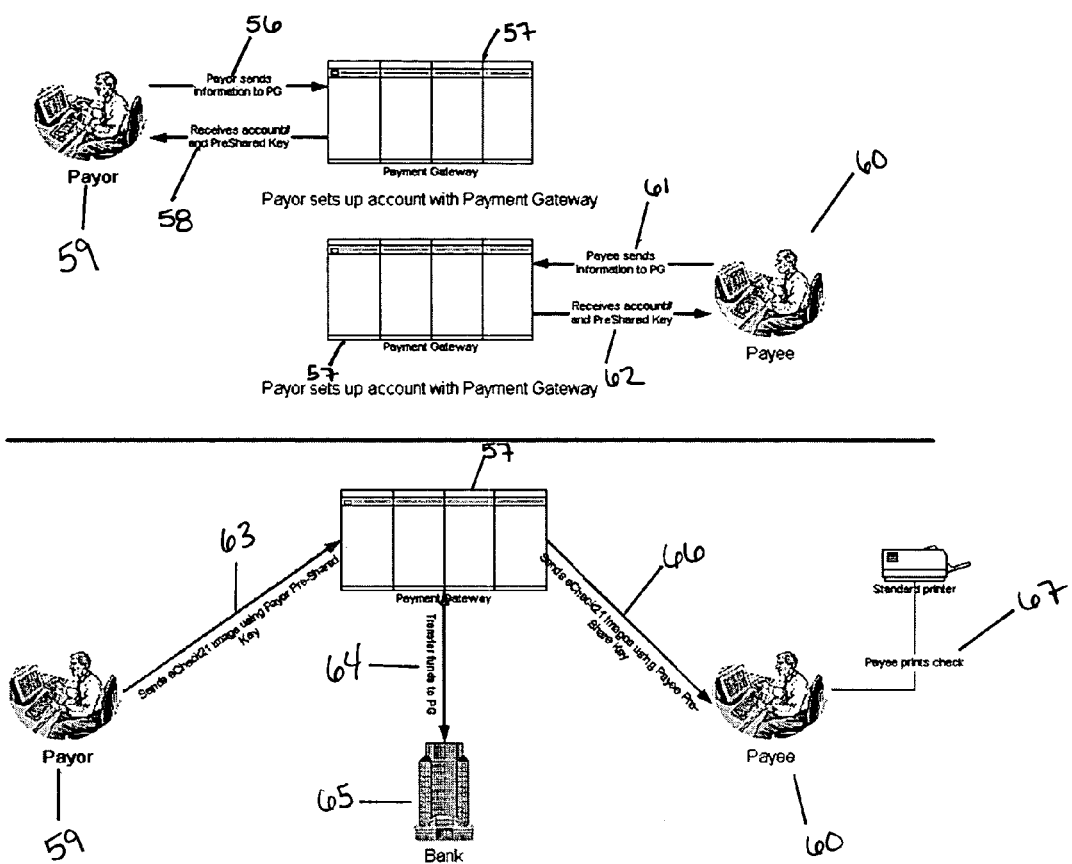
FIG. 5 is a diagram of symmetric encryption using a real-time financial payment gateway.

FIG. 5 shows the steps for encryption and transmission of an electronic check utilizing symmetric encryption and a real-time financial payment gateway. The payor 59 sets up an account with the payment gateway 57 by sending payor information 56 to the payment gateway 57. During the process of account setup, the payment gateway 57 will provide payor 59 with a pre-shared key 58 that will be used to encrypt data between the payor 59 and payment gateway 57. Similarly, the payee 60 will also set up an account with the payment gateway 57 by providing payee information 61 to the payment gateway 57. Payee 60 will receive account information and a pre-shared key 62 for receiving an electronic check image. When the payor 59 needs to make a payment to payee 60, the payor 59 opens up a session with payment gateway 57. The electronic check image is then encrypted using the payor's pre-shared key and transmitted to the payment gateway in step 63. The payment gateway 57 receives the digital image, decrypts it and prints the electronic check paper document. The payment gateway 57 then deposits the electronic check document in the bank 65 and transfers the funds to itself 64. This transfer can be done electronically in real-time as a debit transaction. Upon receipt of funds, the payment gateway 57 re-encrypts the digital image using the payee 60 pre-shared key and sends the image to the payee 66. The software then decrypts the transmission and the payee prints the electronic check paper document 67. The check barcode will be encrypted using a pre-shared key provided by payor's bank. Only the payor's bank will be able to decrypt the barcode and allow the check to be cashed. The bank's pre-shared key will be setup during software installation on the payor's personal computer.

The electronic check exchange shown in FIG. 5 has many advantages. It effectively isolates the payor 59 and payee 60 to the extent that no information needs to be conveyed between the two parties despite that they are using symmetric key encryption. It also reduces the possibility for malicious activity, because the payment gateway 57 acts a "trust" organization that controls the flow of funds. The method also allows for easy audit and dispute resolution. Transaction logs can list each and every electronic transaction, because data flows through the payment gateway.

Figure 6:
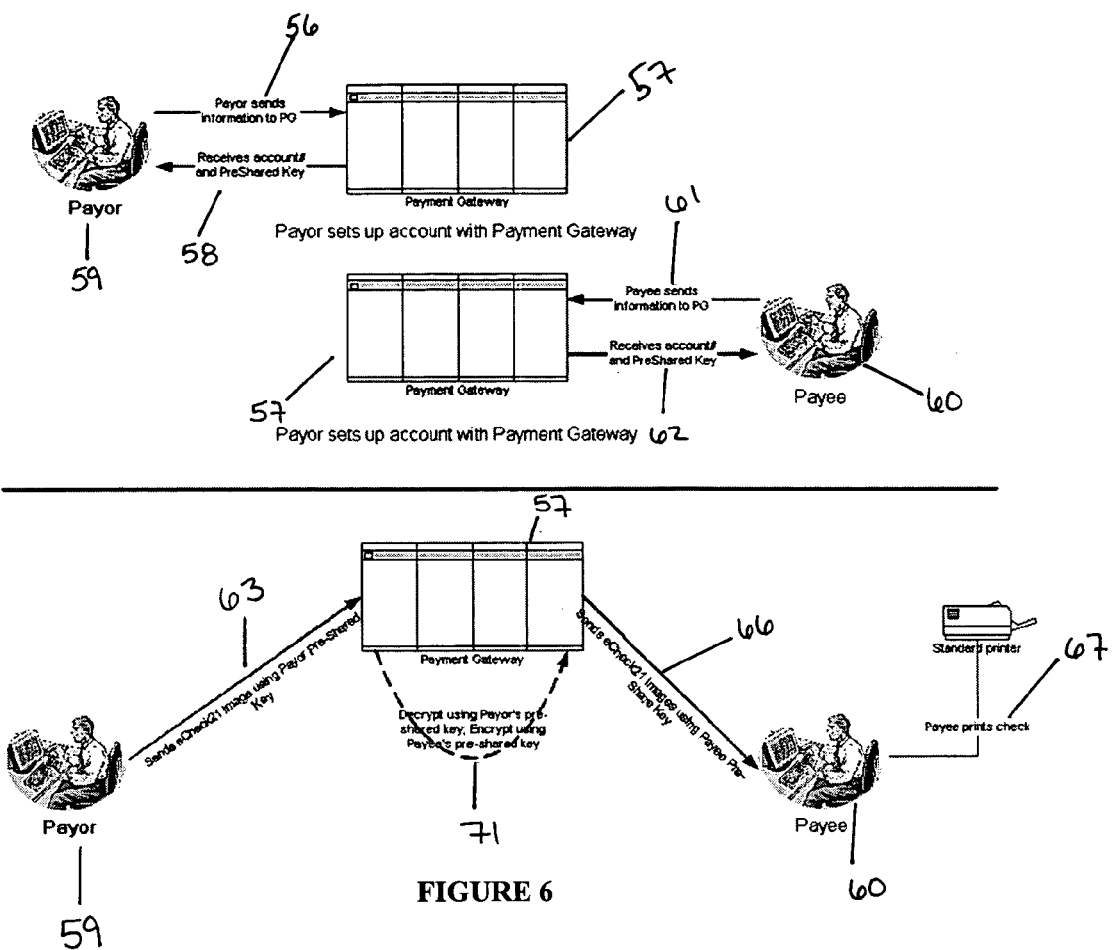
FIG. 6 is a diagram of symmetric encryption using a real-time non-financial payment gateway.

FIG. 6 is a representation of the steps of an electronic check with symmetric encryption using a real-time non-financial payment gateway 57. The payor 59 sets up an account with the payment gateway 57 by providing payor information to the payment gateway 56. During the process of account setup, the payment gateway 57 will provide payor 59 with a pre-shared key and account number 58 that will be used to encrypt data between the payor 59 and the payment gateway 57. Similarly, the payee 60 will also set up an account with the payment gateway 57 by sending payee information 61 to the payment gateway. In return, the payee 60 will receive a pre-shared key and account number 62 for receiving an electronic check image. When the payor 59 needs to make a payment to payee 60, the payor 59 opens up a session with the payment gateway 57. The electronic check image is then encrypted 63 using the payor's pre-shared key and transmitted to the payment gateway 57. The payment gateway 57 receives the digital image, decrypts it and re-encrypts it using payee's pre-shared key in step 71. The transaction is considered "atomic" and the payment gateway 57 has no mechanism of reading the electronic check image or data contained in it. The payment gateway 57 then transmits the electronic check image to the payee 60. The payee software decrypts the transmission and prints the electronic check paper document in step 67. A check barcode is encrypted using a pre-shared key provided by payor's bank. Only that bank will be able to decrypt the barcode and allow the check to be cashed. The bank's pre-shared key will be setup during software installation on the payor's personal computer.

The electronic check transmission in FIG. 6 has many advantages. It effectively isolates the payor 59 and payee 60 to the extent that no information needs to be conveyed between the two parties despite that they are using symmetric key encryption. The transmission happens in real-time. Additionally, since funds are not transferred by the payment gateway 57, there are not any privacy issues.

Figure 7:
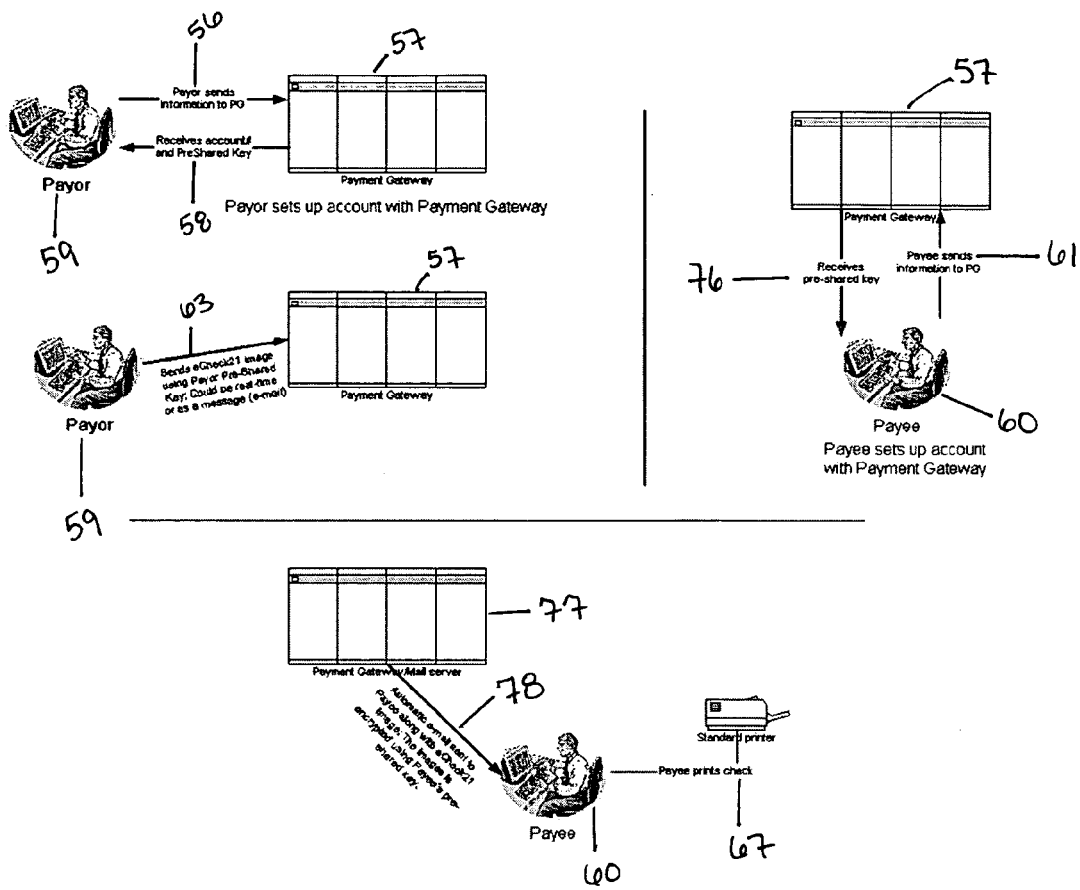
FIG. 7 is a diagram of symmetric encryption using payment gateway integrated with mail server.

FIG. 7 shows the electronic check with symmetric encryption using a payment gateway integrated with a mail server providing email or web messaging. The payor 59 sets up an account with a payment gateway 57 by providing payor information to the payment gateway 56. During the process of account setup, the payment gateway 57 will provide the payor 59 with a pre-shared key and account information 58 to be used to encrypt data between the payor 59 and the payment gateway 57. When the payor 59 needs to make a payment to the payee 60, the payor 59 opens up a session with the payment gateway 57. The electronic check image is then encrypted using the payor's pre-shared key and transmitted to the payment gateway in real-time or by sending an encrypted message to the payment gateway as shown in step 63. The payment gateway 57 receives the digital image and retrieves payee information from its database. If the payee 60 does not have an account with the payment gateway 57, an email is sent to payee 60 inviting payee 60 to set up an account and receive payment. Payee 60 creates an account with the payment gateway 57 by providing payee information to the payment gateway 57 in step 61. During account set up the payment gateway 57 provides payee 60 with a pre-shared key in step 76. Once the payee account is set up, the payment gateway 57 decrypts the electronic check image using payor's pre-shared key and re-encrypts it using payee's pre-shared key. The electronic image is then sent to the payee 60 through email in step 78 from a payment gateway with a mail server 77. The payee 60 uses special software and pre-shared key to print the electronic check paper document to the payee's local printer in step 67. The check barcode will be encrypted using a pre-shared key provided by payor's bank. Only that bank will be able to decrypt the barcode and allow the check to be cashed. The bank's pre-shared key will be setup during software installation on the payor's personal computer.

The advantages to the system shown in FIG. 7 are the fact that the transmission is in non-real time and allows the payee 60 to retrieve the check anytime from anywhere the payee can access email. The payee 60 does not need any special software to retrieve the check. The payee 60 can log in using a standard browser, and get the check. Additionally, the payment gateway 57 does not store the payee's pre-shared key. Since the check image is stored on the payment gateway, dispute resolution and transaction audit will be much easier.

Figure 8:
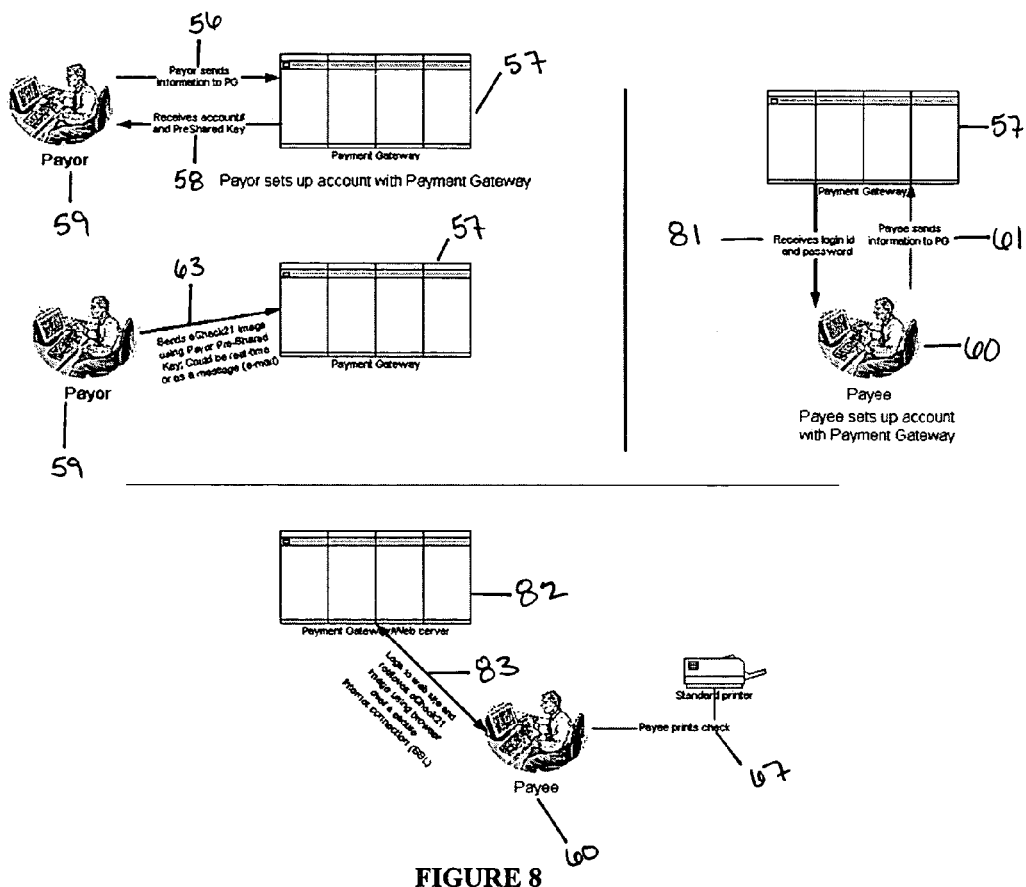
FIG. 8 is a diagram of symmetric encryption using payment gateway integrated with a web server.

FIG. 8 is a representation of the steps of an electronic check encryption and transmission utilizing symmetric encryption and a payment gateway integrated with web server. The payor 59 sets up an account with the payment gateway 57 by providing by providing payor information to the payment gateway in step 56. During the process of account set up, the payment gateway 57 provides the payor with a pre-shared key and account number 58 that will be used to encrypt data between the payor and the payment gateway 57. When the payor 59 needs to make a payment to the payee 60, the payor 59 opens up a session with the payment gateway 57. The electronic check image is then encrypted using the payor's pre-shared key and transmitted to the payment gateway 57 in real-time or by sending an encrypted message to the payment gateway 57 in step 63. The payment gateway 57 receives the digital image and retrieves the payee information from its database. If the payee does not have an account with the payment gateway 57, an email is sent to the payee 60 inviting him to set up an account to receive payment. The payee 60, using a web browser creates an account with the payment gateway 57 by providing the payment gateway 57 with payee information in step 61. During account set up a secure login ID and password combination are provided to the payee in step 81. Once the account is set up, the payment gateway 57 sends an invitation to the payee 60 to retrieve the check from its web server. The payee 60 logs into the payment gateway web server 82 website and initiates the check retrieval process. At that point the payment gateway web server 82, decrypts the electronic check image using the payor's pre-shared key and displays the check image over a secure link ("SSL") in step 83. The payee 60 then prints the electronic check paper document to the payee's local printer in step 67. The check barcode is encrypted using a pre-shared key provided by the payor's bank. Only the bank will be able to decrypt the barcode and allow the check to be cashed. The bank's pre-shared key will be setup during software installation on the payor's personal computer.

There are many advantages to the electronic check transmission shown in FIG. 8. The non-real time allows the payee 60 to retrieve the check anytime from anywhere. The payee does not need any special software to retrieve the check. The payee can log in using a standard browser and get the check. The payment gateway does not transmit or store payee's pre-shared key. Since the check image is stored on payment gateway, dispute resolution and transaction audit will be much easier. Additionally, neither party needs to have prior knowledge of each other, except for information as required to write a standard check and the email ID. This is a far more secure transmission than a transmission in real-time. The payor 59 is not dependent on the payee being online or having an account with the payment gateway 57.

Figure 9:
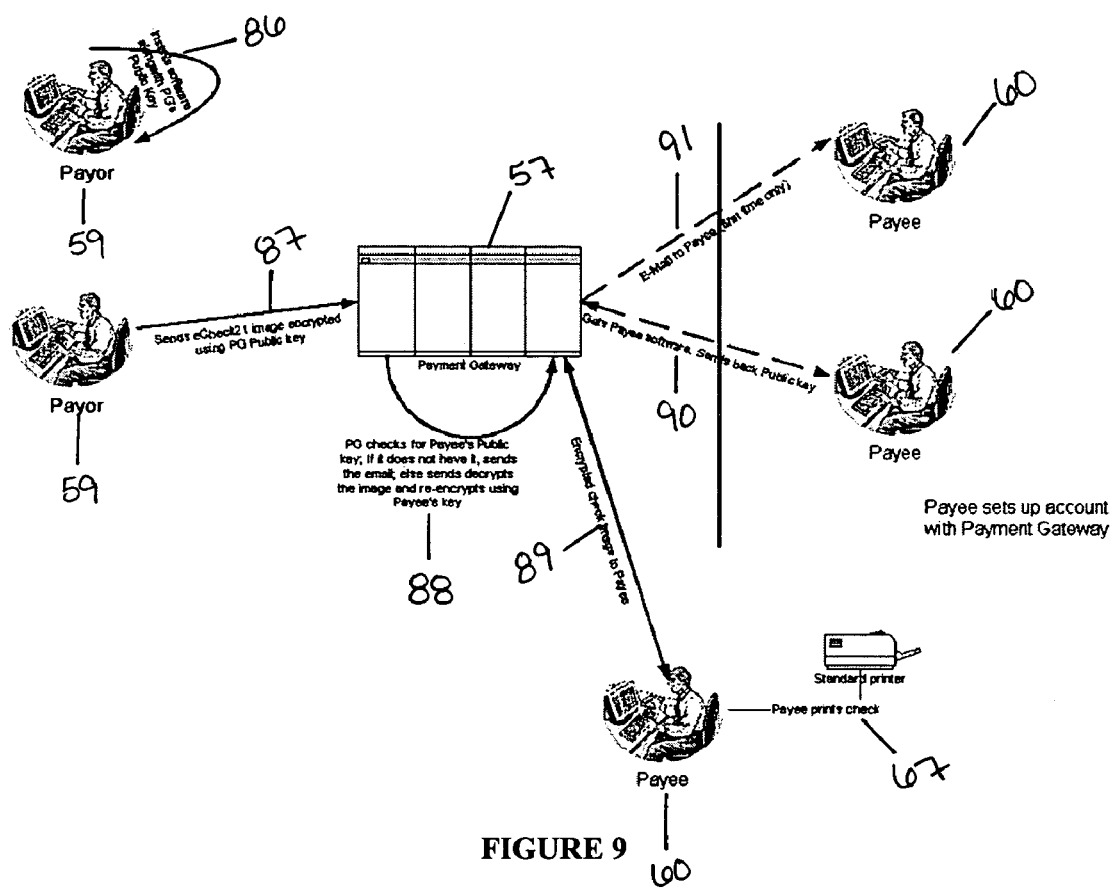
FIG. 9 is a diagram of PKI based encryption using a real-time non-financial payment gateway.

FIG. 9 is a representation of a PKI based encryption using a real-time non-financial payment gateway. In step 86, the payor 59 installs the software on his personal computer. The software also installs the public key for the payment gateway in step 86. When the payor 59 creates the digital image for the payee 60, the digital image will be encrypted using the payment gateway's public key. The encrypted image will be sent in real-time to the payment gateway 57 over the internet in step 87. The payment gateway 57 will receive the image and examine its database to determine if it has the payee's public key. If it does, they payment gateway 57 will decrypt the digital image using its private key and re-encrypt it using the payee's public key 88. The payment gateway 57 then transmits the encrypted electronic check to the payee 60 in step 89. If the payment gateway determines that it does not have payee's public key, the payment gateway 57 will send an automatic email to the payee to register with the server, as shown in step 91. Upon registration, the payee 60 will download and install the electronic check payee software to his personal computer. The software will request the payee 60 to generate the public/private key pair. The public key is sent to the payment gateway 57 for storage in step 90. Subsequently, they payment gateway 57 will send the encrypted check to the payee 60 as shown in step 89. The payee 60 will use the payee software to print the check in step 67. The check barcode will be encrypted using the payor's bank's public key. Only that bank will be able to decrypt the barcode using its private key and allow the check to be cashed. The bank's public key will be setup during software installation on the payor's personal computer.

There are many advantages to the methods shown in FIG. 9. Firstly, none of the "sensitive" keys are transmitted over the internet. The PKI mechanism is much safer compared to the symmetric key mechanisms. Additionally, the payment gateway 57 does not store any check related information. The payment gateway 57 is non-financial and therefore does not act as a third-party clearing house.

Figure 10:
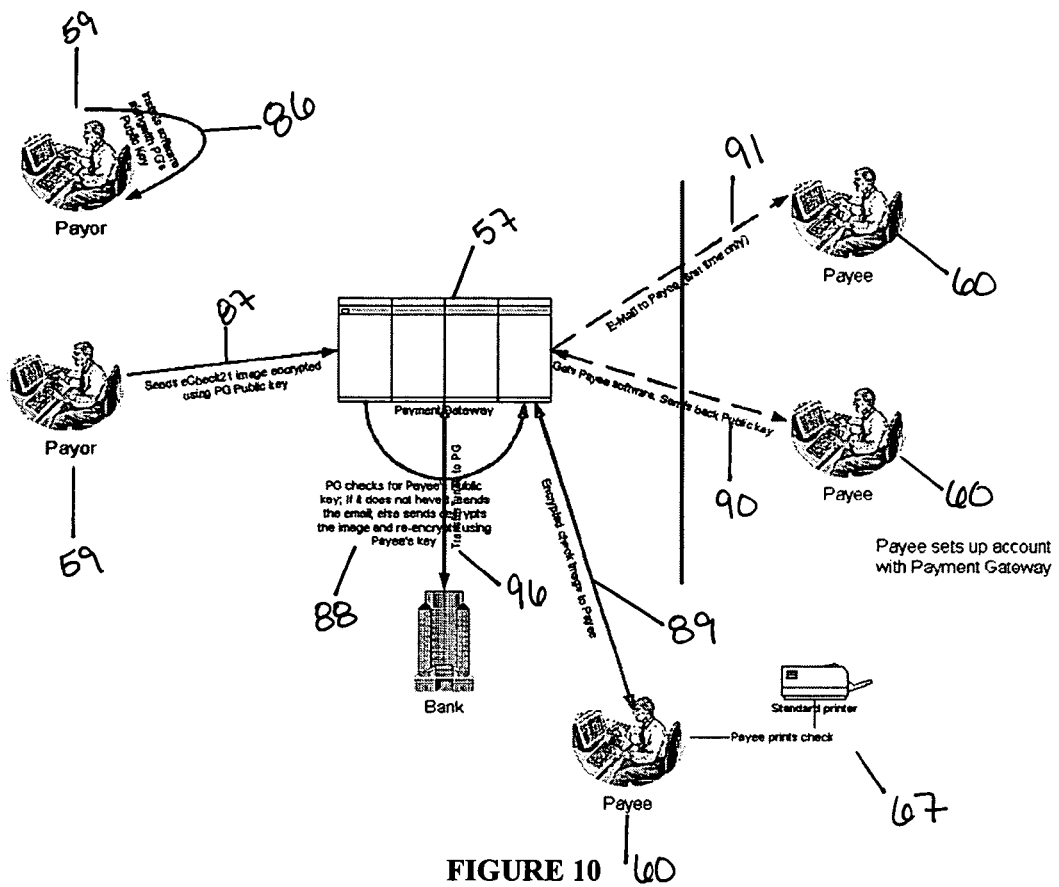
FIG. 10 is a diagram of PKI based encryption using a real-time financial payment gateway.

FIG. 10 shows an electronic check with a PKI based encryption using a real-time financial payment gateway. This mechanism is quite similar to the previous mechanism disclosed in FIG. 9, except in this case the payment gateway 57 will also act as a financial institution or a third-party clearing house. The payor monies will be received by the payment gateway 57 and deposited in its neutral account. The bank transmits the funds to the payment gateway in step 96. The transaction is then sent to the payee 60 and monies will be transferred from the payment gateway 57 to the payee 60 in step 89. The check barcode will be encrypted using the payor's bank's public key. Only the bank will be able to decrypt the barcode using its private key and allow the check to be cashed. The bank's public key will be setup during software installation on the payor's personal computer.

There are many advantages to the electronic check system shown in FIG. 10. The "sensitive" keys are not transmitted over the internet and therefore, the PKI mechanism is much safer compared to the previous symmetric key mechanisms. Additionally, when the payment gateway 57 is involved at the financial level, the payment gateway 57 will be able to play a major role in minimizing fraudulent activities. The payment gateway 57 will also have the check details, including the check amount, in its audit logs. This makes dispute resolution much easier and more reliable.

Figure 11:
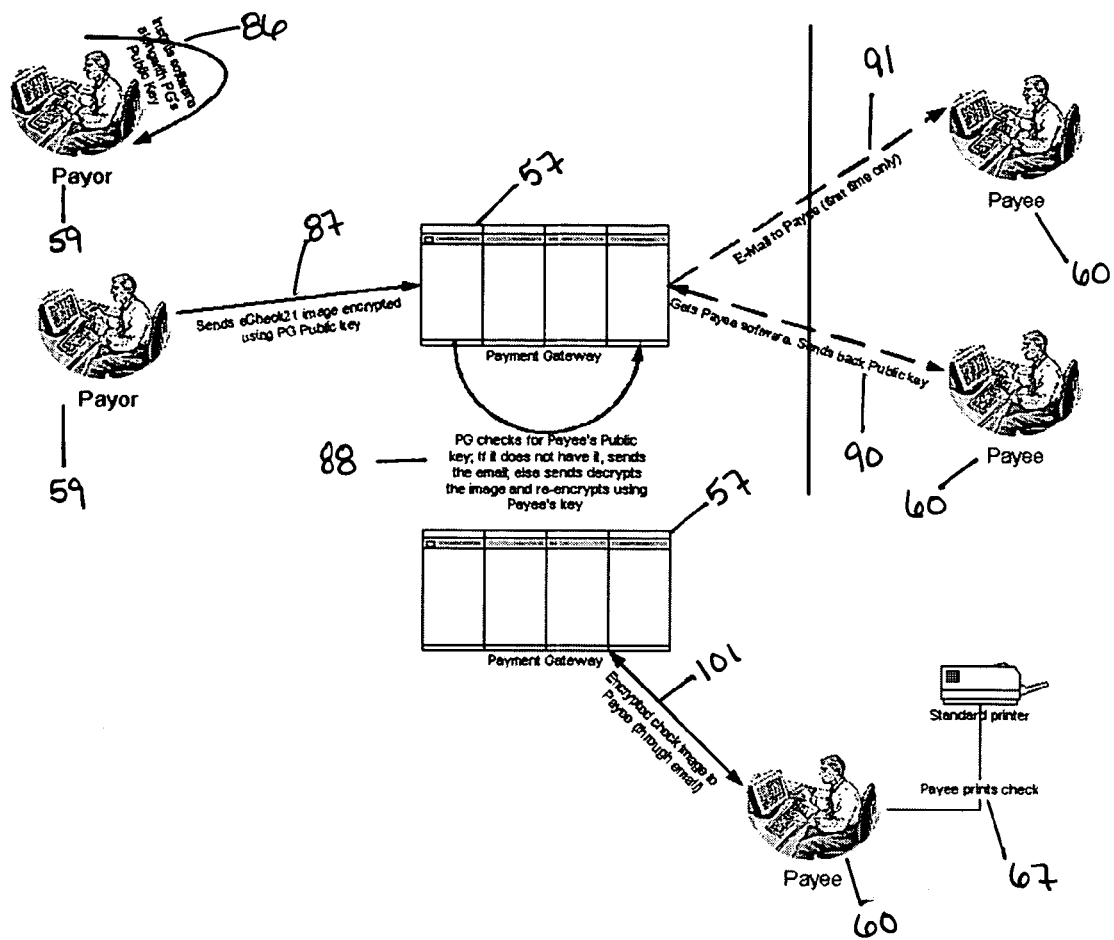
FIG. 11 is a diagram of PKI based encryption using a payment gateway and email or web messaging.

FIG. 11 represents a PKI based encryption using a payment gateway and email web messaging. As an email based solution this mechanism cuts down on the disadvantages related to a real-time system. The payor 59 installs the electronic check payor software on their machine in step 86. During installation, shown in step 86, the payor 59 also installs the payment gateway's public key. When the payor 59 needs to cut a check to the payee 60, the software will check if it already has payee's public key during step 88. If the payment gateway 57 does have payee's public key, the software will encrypt the digital check image using payee's public key and email encrypted data to the payee directly, as shown in step 101. Because the system uses PKI, a hacker will not be able to decrypt the digital image as they would need a private key which is only with the payee 60. If the payor software does not have payee's public key it will request the payee's public key from the payment gateway 57. The payment gateway 57 will check its database for payee's public key and if it has one, will return the same to payor who will then encrypt and send the digital image to the payee directly in step 88. If the payment gateway 57 does not have payee's public key, it will send a negative response to the payor 59. The payor 59 will then encrypt using the payment gateway's public key and email the encrypted check image to the payment gateway 57 shown in step 87. The payment gateway 57 will send an automatic email to payee 60 to download and install the electronic check payee software on his personal computer as shown in step 91. During installation, the payee software will generate the public/private key pair in step 90. The public key will be sent to the payment gateway 57, also shown in step 90. The payment gateway 57 will subsequently, decrypt the digital check image using its own private key, re-encrypt it using payee's public key and send it through email to payee as shown in step 101. The payee software will decrypt the electronic check using the payee private key and print the check image in step 67. The check barcode will be encrypted using the payor's bank's public key. Only the payor's bank will be able to decrypt the barcode using its private key and allow the check to be cashed. The bank's public key will be setup during software installation on the payor's personal computer.

There are many advantages to system shown in FIG. 11. This system is the preferred embodiment of the invention compared to the previous scenarios. This solution does not involve any real-time systems and is easy on the payee and payor. The system also does not expose sensitive data or private keys at any step. The system is much cheaper to implement in comparison to a real-time or symmetric key based solution.

Figure 12:
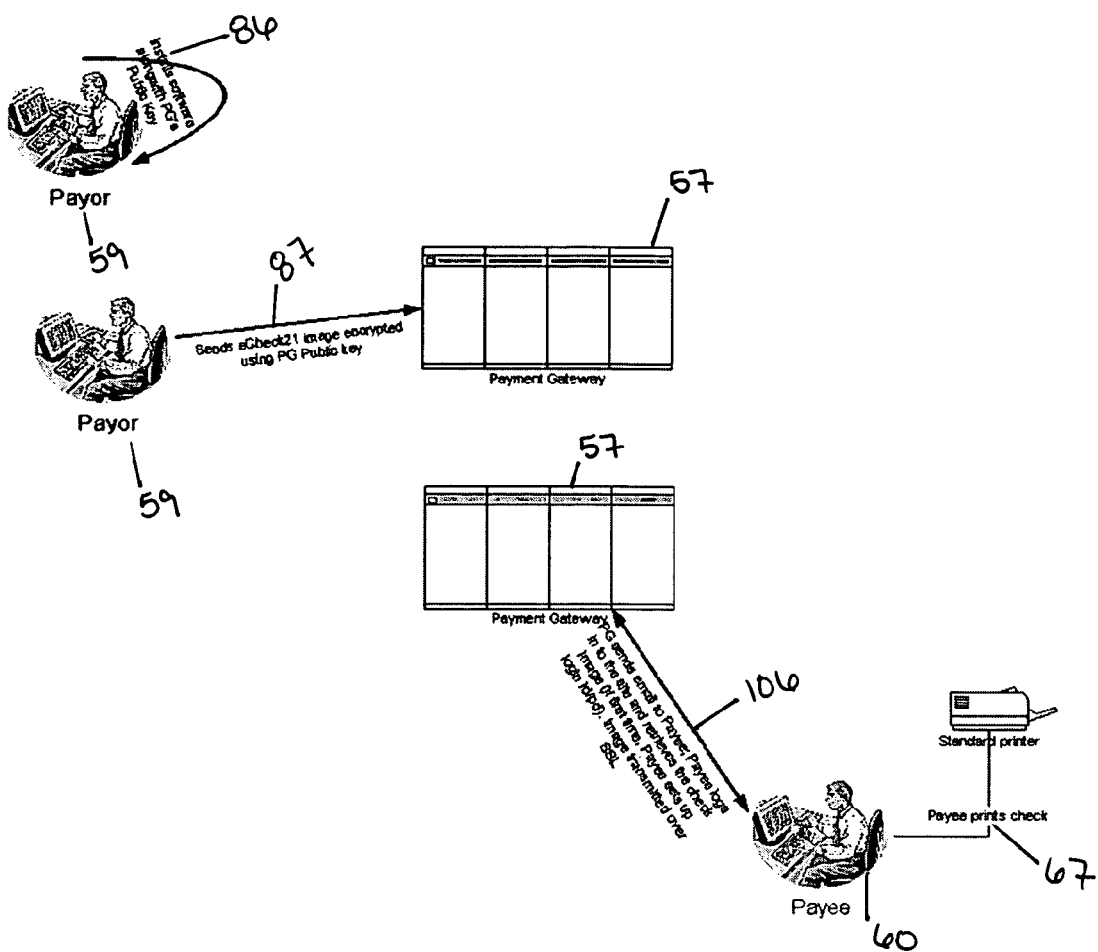
FIG. 12 is a diagram of PKI based encryption using a payment gateway integrated with a web server.

FIG. 12 is a flow diagram representing transmission of an electronic check with PKI based encryption using a payment gateway integrated with web server. A web-based solution addresses the issue of the payee 60 needing special software. In this case, the payor 59 installs the electronic check payor software on the payor machine in step 86. During installation the payor 59 will also install the payment gateway's public key, also shown in step 86. When the payor 59 needs to issue a check to the payee 60, the software will encrypt the electronic check image using the payment gateway's public key and email the encrypted check image to payment gateway 57, as shown in step 87. The payment gateway 57 will send an automatic email to payee 60 to visit its web-site, shown in step 106. Upon proper authentication, payee will be given a login ID and password on the payment gateway's site in step 106. The payee 60 can then view and print the check image directly from the website in step 67. The data is transmitted over a secure line ("SSL") to the payee's browser ensuring security in step 106. The check barcode will be encrypted using the payor's bank's public key. Only the bank will be able to decrypt the barcode using its private key and allow the check to be cashed. The bank's public key will be setup during software installation on the payor's personal computer.

The system shown in FIG. 12 eliminates the need for the payee to have special software. The system offers the best transmission and encryption mechanism that is secure, easy to use and does not expose data to unscrupulous entities. It is much cheaper to implement in comparison to a real-time or symmetric key based solution.

Considering the advantages and disadvantages associated with each possible system and method of transmission and encryption of an electronic check, there are numerous combinations that can be implemented to encrypt and transmit electronic check data. Accordingly, the preferred embodiment will: maximize security; maximize penetration and early adoption of the system; minimize the involvement of a third-party; and minimize software needs on the payee's machine.

An ideal solution will be a combination of multiple systems mentioned above. The PKI encryption system seems to be more advantageous than the symmetric key approach; however, several embodiments of the invention can be created from combinations of the above systems. Additionally, message based transmissions seem superior as a solution in comparison to real-time processing.

Figure 13:
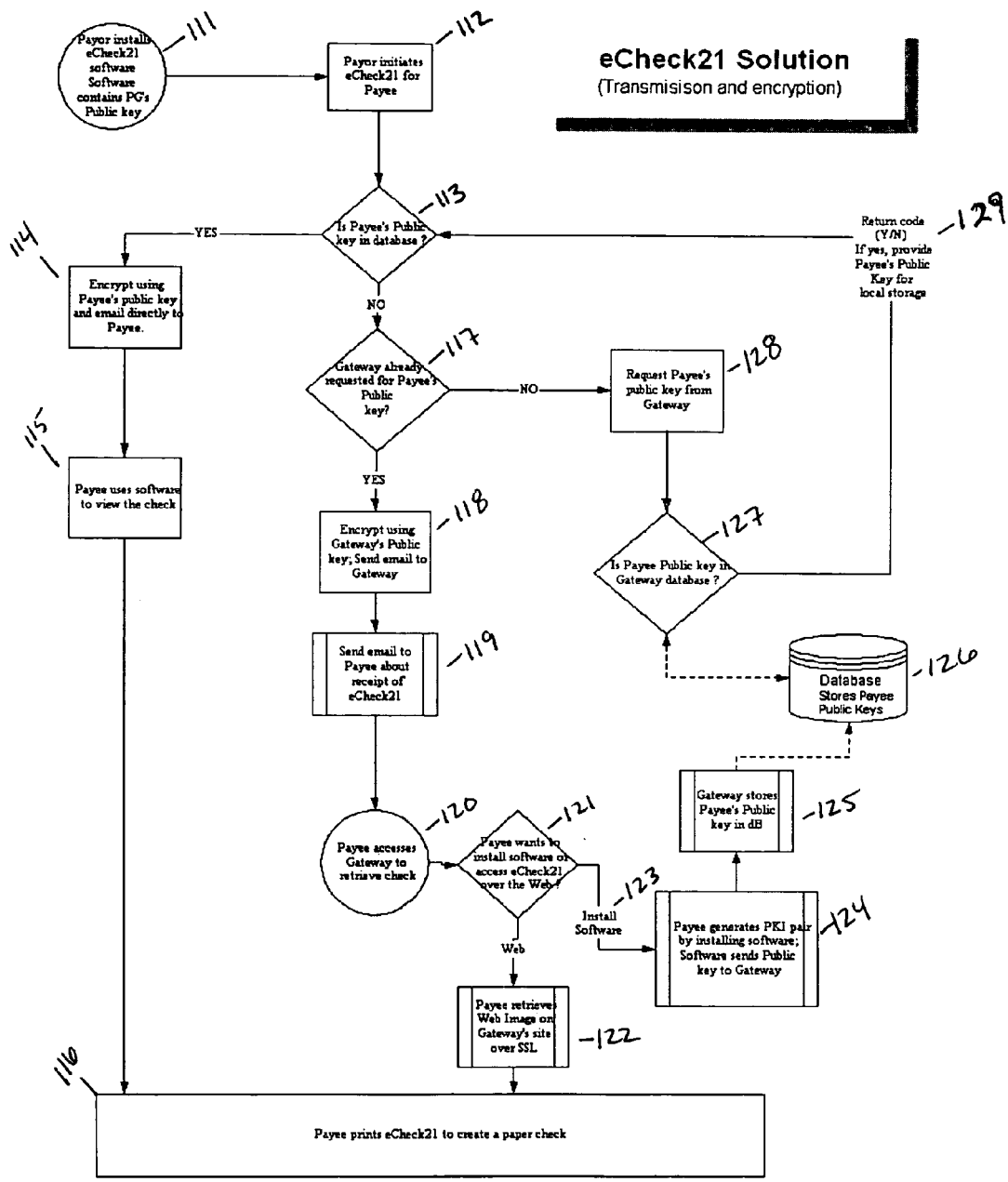
FIG. 13 is a flow diagram for the encryption and transmission of an electronic check.

FIG. 13 is a flow chart of the preferred embodiment of the encryption and transmission of an electronic check. The preferred embodiment used by the electronic check system is based on the PKI encryption method with a message based transmission model. This system gives the payee the choice to either access the electronic check image from the payment gateway's website or on the payee's local personal computer using the payee software. In step 111, the payor installs the electronic check software, which contains the payment gateway's public key. Next, the payor initiates the electronic check for the payee in step 112. The payment gateway determines if the payee's public key is in the database in step 113. If the payee's public key is in the payment gateway's database, then in step 114 the electronic check image is encrypted using the payee's public key and the image is emailed directly to the payee. In step 115, the payee uses software to view the electronic check image. The payee can then print the electronic check to create a paper check, as shown in step 116.

If the payment gateway does not have the payee's public key in its database as shown in step 113, then the software determines if the payment gateway has already requested the payee's public key in step 117. If the payment gateway has already requested the payee's public key 117, then the electronic check image is encrypted using the payment gateway's public key and an email is sent to the payment gateway in step 118. In step 119, an email is then sent to the payee about receipt of an electronic check. The payee accesses the payment gateway to retrieve the check in step 120. The payee then decides if he or she would like to install software or access the electronic check over the web messaging system in step 121. If the payee chooses to retrieve the electronic check over the web, the payee retrieves the web image on the payment gateway's site over SSL in step 122. If the payee chooses to install the software in step 121, the then payee downloads and installs the software in step 123. The payee then generates a PKI pair during installation of the software and the software sends a public key to the payment gateway in step 124. The payment gateway stores the payee's public key in its database in steps 125 and 126.

If the payment gateway has not requested the payee's public key 117, then the software requests the payee's public key from the payment gateway in step 128. The payment gateway determines if the payee public key is in the payment gateway database in step 127 and 126. If the payee's public key is found, it is provided to payor's software for local storage in step 129.

Figure 14:
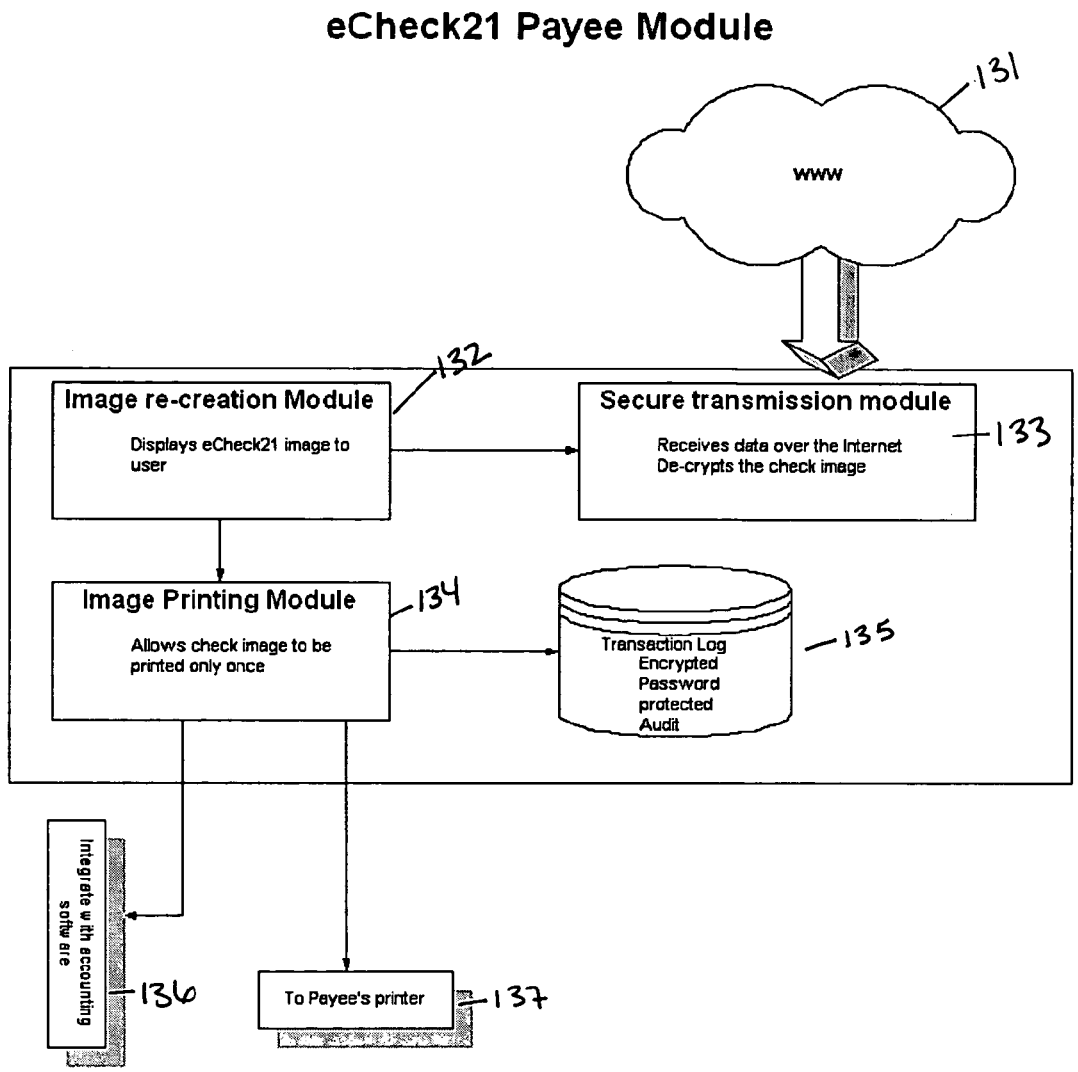
FIG. 14 is a flow diagram showing the electronic check payee module.

The electronic check payee software module is shown in the flow chart of FIG. 14. This flow chart shows the receipt 133, decryption 133 and printing 137 of the electronic check image by the payee. Depending on the chosen mechanism to retrieve the electronic check image, the electronic check payee software design will vary and, in the case of a web server based retrieval 131, is not even needed. In any case, the electronic check payee software mechanism deployed for payee must decrypt 133 the electronic check to a final image 132, allow the electronic check image to be printed only once 134, and should be able to be integrated with payee's accounting system 136 to post check receipt. The software will also keep a transaction log that provides for an encrypted, password protected audit 135.

Figure 15:
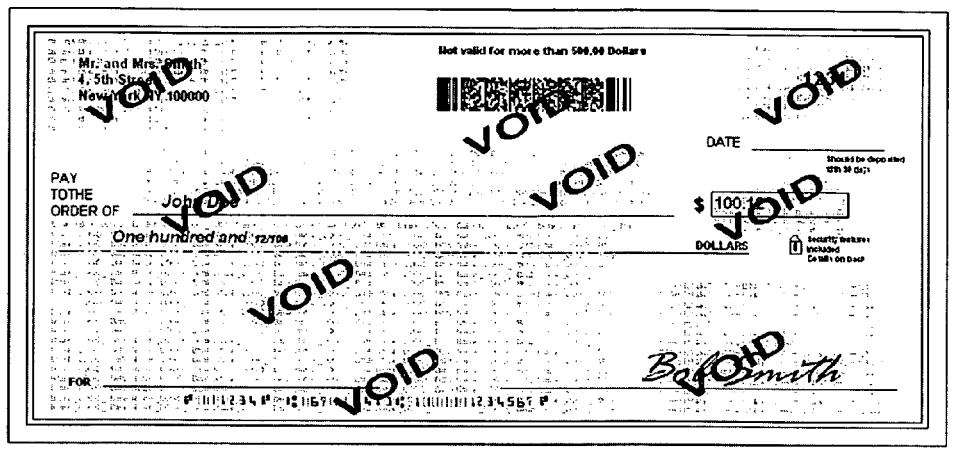
FIG. 15 is a sample check image that will be displayed on a payee's computer.

The secure transmission module 133 shown in FIG. 14 will decrypt the electronic check image using the payee's private key. The payee's private key in turn will be created using a password known only to the payee. Without this password the electronic check transmission will not be decrypted and will not be usable. The payee will also be given an option to create or recreate the private/public key. When the payee chooses to create the new key pair, the public key will be transmitted to the payment gateway. The image re-creation module 132 generates the electronic check image on the payee's personal computer so the image can be displayed. To protect against malicious activity, the displayed image 141 will be marked "VOID" in numerous places a sample of which is shown in FIG. 15. Additionally, the image re-creation module 132 will disable all controls that could enable the user to modify, select, cut, copy or paste any portion of the image. Instead of developing new imaging software, this module is a "plug-in" and adapts to readily available software, e.g. Adobe Acrobat Reader.

Referring back to FIG. 14, the image printing module 134 will allow the payee to print the electronic check image as the final check. The software will have controls that will not allow the payee to print the image more than once. Adequate warning to set up the printer and a sample test page are implemented to ensure that the payee has the printer set up properly. In a situation that the payee is not able to print the check successfully, the payee will have to call customer service to get a code that will be needed to print the check again.

The electronic check system of the preferred embodiment employs several fraud protection features. The system is in close if not complete compliance with X9 check security features. The system uses encrypted barcodes. The check background has payor/payee names, amount, and check number repeated multiple times. The legal amount limit is on each check. The check has to be deposited within 30 days to stay valid. The check image uses micro-types. The payee is disabled from being able to print multiple copies of the check. The systems use state of the art PKI based encryption methods.

Accordingly, it will be understood that the preferred embodiment of the present invention has been disclosed by way of example and that other modifications and alterations may occur to those skilled in the art.

What is claimed is:

1. A method for securely sending a check comprising:
preparation by a payor using software on a machine readable medium of an electronic check which is an encrypted electronically generated digital image of a negotiable paper check when converted to a paper check;
transmission of said electronic check from said payor to a payee;
receipt and decryption of said electronic check by payee; and
conversion of said electronic check to a negotiable paper check by the payee;
said digital image including a bar code containing a digital signature and information selected from the group consisting of payor's details, bank information, check amount and combinations thereof; and
said digital image including a visible background that is visible when converted to said negotiable paper check and that repeats unencrypted information from said electronic check, wherein said unencrypted information is selected from the group consisting of payor details, payee details, bank information, check details, payor name, a payor account number, a payee name, a check dollar amount, a check date, a check number, a bank ach routing number and combinations thereof.

2. The method of claim 1, wherein said electronic check is prepared utilizing software on a personal computer.

3. The method of claim 2, wherein said software communicates with and updates said payor's accounting software.

4. The method of claim 1, wherein during the preparation of said electronic check, said electronic check is encrypted with symmetric key encryption.

5. The method of claim 1, wherein during the preparation of said electronic check, said electronic check is encrypted with public key infrastructure.

6. The method of claim 1, wherein the transmission of said electronic check is by email.

7. The method of claim 1, wherein the transmission of said electronic check is through a secure web-based application.

8. The method of claim 1, wherein said conversion of said electronic check is performed by a printer.

9. A method for sending a payment using a check comprising the steps of:
preparation by a payor using a software program on a machine readable medium of an electronically generated digital image of a negotiable paper check when produced as an image of a paper check including a bar code containing a digital signature and information selected from the group consisting of payor's details, bank information, check amount and combinations thereof;
encryption of said digital image as an electronic check;
transmission of said electronic check from said payor to a payee; and
decryption of said electronic check by the payee to produce said image of said negotiable paper check;
said digital image including a visible background that is visible when converted to said negotiable paper check and that repeats unencrypted information from said electronic check, wherein said unencrypted information is selected from the group consisting of payor details, payee details, bank information, check details, payor name, a payor account number, a payee name, a check dollar amount, a check date, a check number, a bank ach routing number and combinations thereof.

10. The method of claim 9, wherein said digital image of said electronic check is encrypted with symmetric key encryption.

11. The method of claim 9, wherein said digital image of said electronic check is encrypted with public key infrastructure encryption.

12. The method of claim 9, wherein said transmission of said electronic check is by email.

13. The method of claim 9, wherein said transmission of said electronic check is through a secure web-based application.

14. The method of claim 9, comprising the further step of converting said digital image of said electronic check to said negotiable paper check by printing a negotiable paper check from said digital image of said electronic check.

15. The method of claim 9, wherein said electronic check is further transmitted by said payee to a bank prior to said decryption.

16. A system for sending a payment comprising:
means for a payor to prepare an electronic check by inputting a payment amount, payee name and payee address into a payor software program on a machine readable medium, wherein said software program generates an electronically generated digital image of a negotiable paper check when printed as said electronic check, including a bar code containing a digital signature and information selected from the group consisting of payor's details, bank information, check amount, and combinations thereof;

means for encryption of said electronic check utilizing a payee's pubic key;

means for transmission of said electronic check by said payor to said payee;

means for decrypting said electronic check by said payee using said payee's private key; and means for printing by said payee of a negotiable paper check from said electronic check; said program generating in the digital image a visible background that is visible when printed and that repeats unencrypted information from said electronic check, wherein said unencrypted information is selected from the group consisting of payor details, payee details, bank information, check details, a payor name, a payor account number, a payee name, a check dollar amount, a check date, a check number, a bank ach routing number and combinations thereof.

17. The method of claim 9, wherein said digital signature is created using a payor's private key and at least a portion of the bar code information, wherein said bar code information is selected from the group consisting of payor details, payee details, bank information, check details, a payor name, a payor account number, a payee name, a check amount, a check date, a check number, a bank ach routing number and combinations thereof.

18. The system of claim 16, wherein said digital signature is created using a payor's private key and at least a portion of the bar code information, wherein said digital signature is appended to said unencrypted information, and wherein said bar code information is selected from the group consisting of payor details, payee details, bank information, check details, a payor name, a payor account number, a payee name, a check amount, a check date, a check number, a bank ach routing number and combinations thereof.

19. The system of claim 16, including means to provide in said electronic check a background that is visible when printed and that repeats unencrypted information from said electronic check, wherein said unencrypted information is selected from the group consisting of payor details, payee details, bank information, check details, a payor name, a payor account number, a payee name, a check dollar amount, a check date, a check number, a bank ach routing number and combinations thereof.

20. The method of claim 1, wherein said digital signature is created using a payor's private key and at least a portion of the bar code information and wherein said bar code information is selected from the group consisting of payor details, payee details, bank information, check details, a payor name, a payor account number, a payee name, a check amount, a check date, a check number, a bank ach routing number and combinations thereof.

21. A method for sending a payment using a check comprising the steps of:

preparation by a payor using a software program on a machine readable medium of an electronically generated digital image of a negotiable paper check when produced as an image of a paper check including a bar code containing a digital signature and information selected from the group consisting of payor's details, bank information, check amount and combinations thereof;

encryption of said digital image as said electronic check;

transmission of said electronic check via one of e-mail and a secure web-based application to the payee for production of a paper check;

said digital image including in the electronic check a visible background that repeats unencrypted information from said electronic check, wherein said unencrypted information is selected from the group consisting of payor's details, payee's details, bank information, check details, payor's name, a payor's account number, a payee's name, a check dollar amount, a check date, a check number, a bank ach routing number and combinations thereof.

22. The method of claim 21, wherein the digital image is encrypted with public key infrastructure.

23. A device for sending a payment comprising:

means for a payor to prepare an electronic check by inputting a payment amount, and payee's name into a payor software program on a machine readable medium wherein said software program generates a digital image of a negotiable paper check when produced as an image of a paper check as said electronic check including a bar code containing a digital signature and information selected from the group consisting of payor's details bank information, check amount and combinations thereof;

means for encryption of said electronic check; and means for transmission of said electronic check by said payor to a payee via one of e-mail and a secure web-based application for production of a paper check;

said program generating in the digital image a visible background that is visible when printed and that repeats unencrypted information from said electronic check, wherein said unencrypted information is selected from the group consisting of payor details, payee details, bank information, check details, a payor name, a payor account number, a payee name, a check dollar amount, a check date, a check number, a bank ach routing number and combinations thereof.

24. The method of claim 23, wherein the electronic check is encrypted with public key infrastructure.

25. A method for sending a payment using a check comprising the steps of:

preparation by a payor using a software program on a machine readable medium of an electronically generated digital image of a negotiable paper check when converted as an image of a paper check;

encryption of said digital image as said electronic check; and transmission of said electronic check to said payee via one of e-mail and a secure web-based application for conversion to a paper check;

said program providing a background in the digital image that is visible when converted to said image of said negotiable paper check and that repeats unencrypted information selected from the group consisting of payor's details, payee's details, bank information, check details, payor's name, a payor's account number, a payee's name, a check dollar amount, a check date, a check number, a bank ach routing number and combinations thereof.

26. A device for sending a payment comprising:

input means for a payor to prepare an electronic check by inputting a payment amount and payee's name;

means including a payor software program on a machine readable medium for generating a digital image of a negotiable paper check as said electronic check with a background that is visible when converted to an image of said negotiable paper check and that repeats unencrypted information selected from the group consisting of payor details, payee details, bank information, check details, payor name, a payor account number, a payee name, a check dollar amount, a check date, a check number, a bank ach routing number and combinations thereof;

means for encryption of said electronic check; and means for transmission of said electronic check by said payor to a payee via one of e-mail and a secure web-based application for conversion to a paper check.

* * * * *